Sept. 23, 1969  H. VOLKS ET AL  3,468,227

ENVELOPE BLANK FORMING MACHINE

Filed Oct. 25, 1966  12 Sheets-Sheet 1

INVENTORS
HERBERT VOLKS
BY CLARENCE P. OUELLETTE

ATTORNEY

Sept. 23, 1969       H. VOLKS ET AL       3,468,227
ENVELOPE BLANK FORMING MACHINE Filed Oct. 25, 1966                 12 Sheets-Sheet 3

INVENTORS
HERBERT VOLKS
BY CLARENCE P. OUELLETTE

ATTORNEY

Sept. 23, 1969   H. VOLKS ETAL   3,468,227
ENVELOPE BLANK FORMING MACHINE
Filed Oct. 25, 1966                                    12 Sheets-Sheet 5

INVENTORS
HERBERT VOLKS
CLARENCE P. OUELLETTE
BY
ATTORNEY

Fig. 9.

United States Patent Office 3,468,227
Patented Sept. 23, 1969

3,468,227
ENVELOPE BLANK FORMING MACHINE
Herbert Volks, New York, N.Y., and Clarence P. Ouellette, Springfield, Mass., assignors to En Mail Machine Corporation, New York, N.Y., a corporation of Delaware
Filed Oct. 25, 1966, Ser. No. 589,415
Int. Cl. B31b 19/14, 19/74
U.S. Cl. 93—63                                   1 Claim

ABSTRACT OF THE DISCLOSURE

The present invention relates to an envelope forming machine and more particularly for an automatic envelope blank forming machine.

Background of the invention

Envelope blanks are cut from flat strips of paper and comprise a body portion having side flaps and end flaps extending therefrom and integral therewith. Mailing inserts are ordinarily placed on these blanks and the flaps of the blanks are wrapped around the inserts and adhered in place so that a completed mailing envelope is formed which can be mailed by automatic machinery. One machine which is representative of this type of mailing machine is shown in Patent No. Re. 25,961.

Envelope blank forming machines have been used for a number of years. However such envelope blank forming machines have consisted of complicated mechanisms which are not versatile to form envelope blanks of different sizes and types and are not able to operate at high speeds.

The present invention provides for an improved envelope blank forming machine which will operate at greater speeds than heretofore possible.

Another object of the present invention is to provide an improved envelope blank forming machine which is versatile and which will permit envelopes of different sizes and types to be blanked out.

Another object of the present invention is the provision of an improved envelope blank forming machine which will automatically form envelope blanks from a continuous strip of material, such as paper.

Another object of the present invention is the provision of an improved envelope blank forming machine which will automatically form the envelope blank, cut a window therein and apply a transparent cover to the window.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 8 is a sectional view taken along line 8—8 of FIG. 3;

FIG. 18 is a sectional view taken along line 18—18 of FIG. 12.

For convenience the application will first be described generally and details of construction will be described under separate headings.

General description

Figure 1:
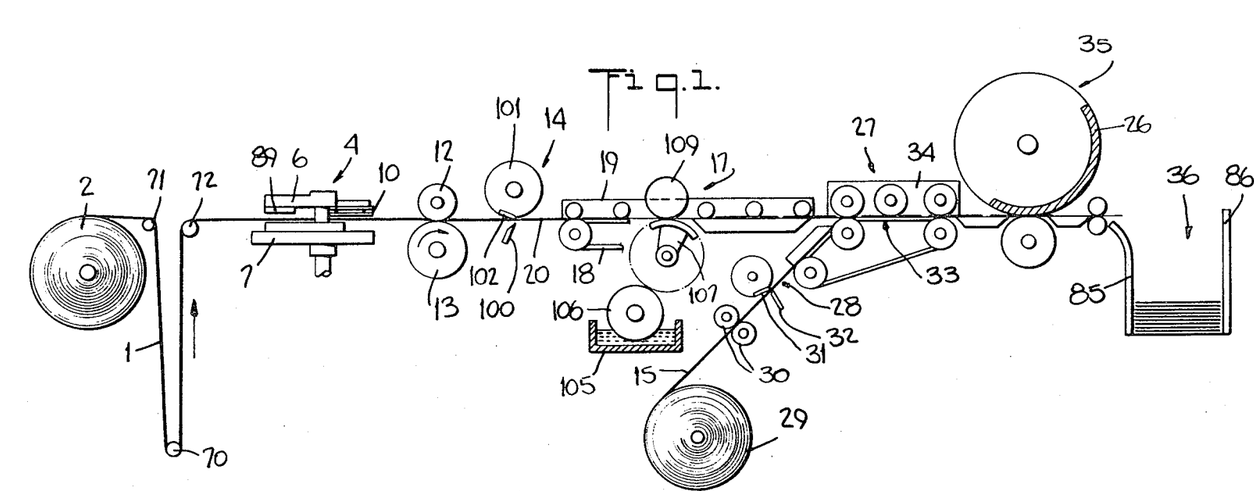
FIG. 1 is a diagrammatic view of the envelope blank forming machine of the present invention.
Figure 1A:
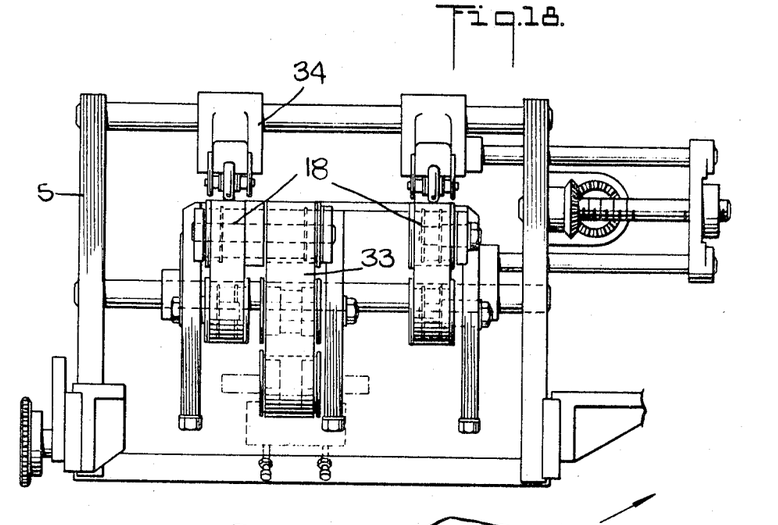
Figure 2:
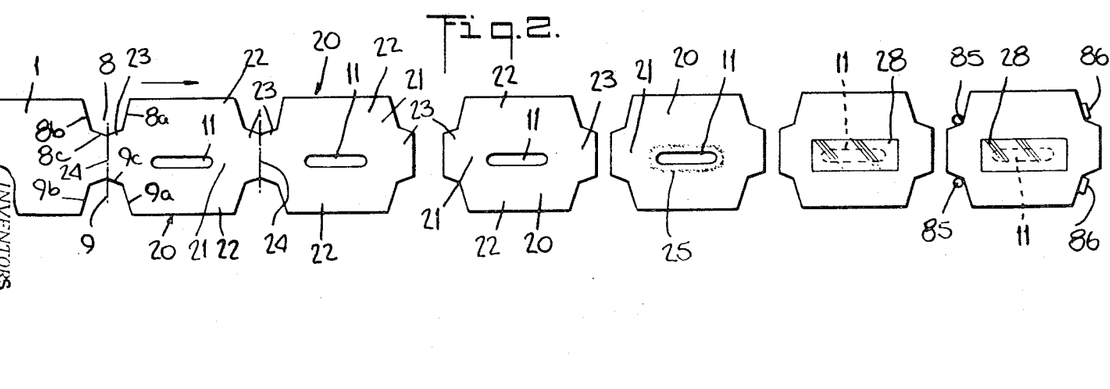
FIG. 2 is a diagrammatic view showing the steps of forming an envelope blank from a continuous strip to the finished envelope blank.

Referring to the drawings and more particularly to FIGS. 1 and 2 a continuous strip 1 of material, such as paper, is fed from a supply roll 2 through a tensioning mechanism 3 to a punch mechanism 4 mounted on the frame 5 (FIG. 6) of the machine. The punch mechanism 4 has a movable male member 6 and a stationary female member 7. The male member 6 has notching punch elements 88 and 89 and is moved downwardly to cut notches 8 and 9 in the edges of the strip 1, as shown in FIG. 2.

The notches 8 and 9 may be of any conventional shape and in the drawings they are shown as having angled side walls 8a–8b and 9a–9b, respectively, and connecting top walls 8c and 9c, respectively. The notches 8 and 9 in the strip 1 will form a series of adjacent envelope blanks 20. Each blank 20 comprises a central body portion 21 having side flaps 22 extending from the sides thereof and end flaps 23 extending from the ends thereof. The end flaps 23 of two adjacent blanks 20 are integral with each other and joined along an imaginary severance line 24 joining the apexes of the top walls 8c and 9c of notches 8 and 9, respectively.

If the envelope blank 20 is to have a window, the punch male member 6 is provided with a suitable window punch mechanism 10 adapted to cut a window 11 in the envelope blank 20.

The envelope blanks 20 are then moved by feed rollers 12 and 13 to a severing mechanism 14 which severs adjacent envelope blanks 20 along the imaginary severance line 24 to form independent and detached envelope blanks 20. The severing mechanism 14 comprises a stationary cooperating member 100 and a knife 102 on a rotatable roller 101 which meet at the imaginary severance line 24 to sever and separate adjacent blanks 20. In the drawing the cooperating member 100 has been shown as a knife edge. However, it will be understood that any cooperating member may be used such as a block.

Each blank 20 is moved to an adhesive-applying mechanism 17 by conveyor 18 and pressure roller assembly 19.

The adhesive-applying mechanism 17 applies an adhesive coating 25 around the edge of the window 11. The blank 20 is then moved by conveyor 18 to a window cover applying mechanism 27. A continuous web of transparent material 15, such as glassine, is supplied by a supply roll 29 and is fed by rollers 30 between a knife 31 and a cooperating member (shown in the drawings as a knife edge) where it is cut into strips or window covers 28. Each window cover 28 is applied to the window 11 by conveyor 33 and rolled assembly 34 and adhered thereto by the adhesive 25.

The blank 20 is then moved to a printing mechanism 35 which applies a message, postal indicia or any other desired data to the blank 20. The finished blank 20 is then deposited into a hopper 36 from which the blanks can be fed to a folding machine or stored and/or shipped flat.

Drive gear mechanism

Figure 3:
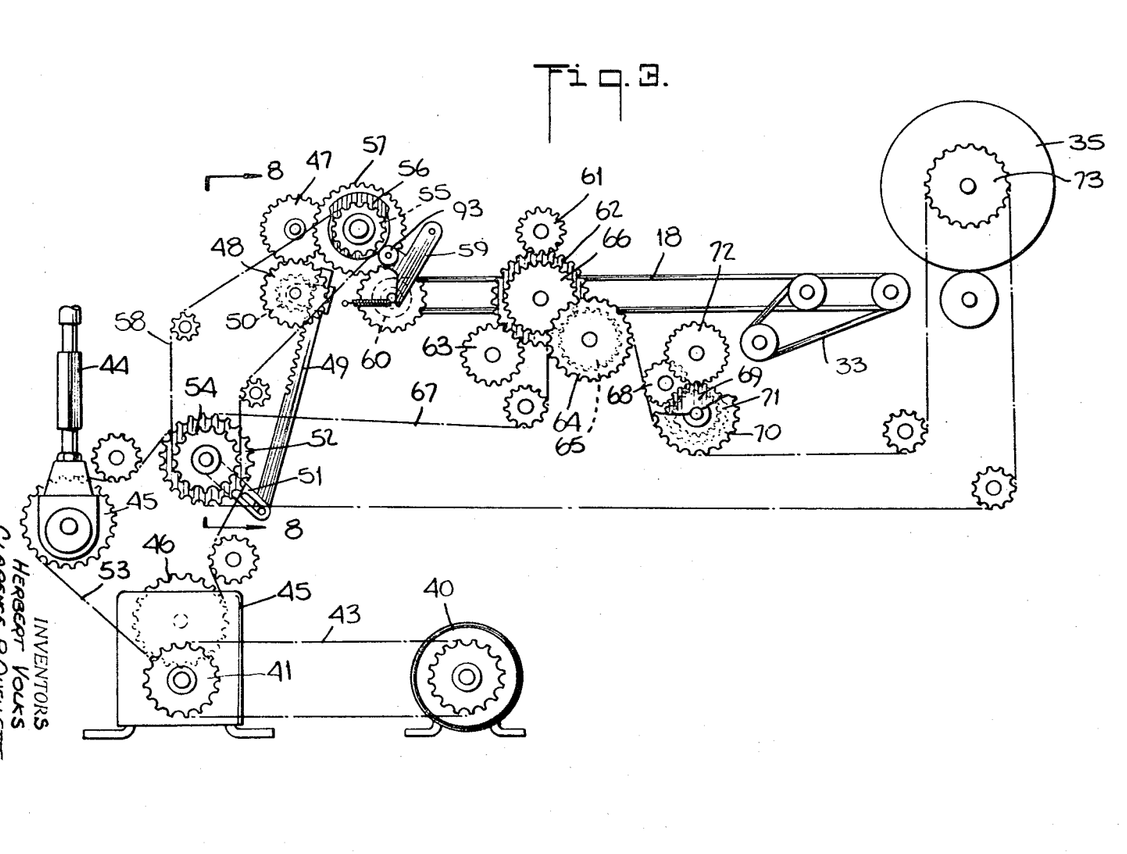
FIG. 3 is a diagrammatic view of the drive gear mechanism used in connection with the machine shown in FIG. 1.

The drive gear mechanism which is used to operate the machine of the present invention is shown in FIG. 3. Power is obtained from any suitable source, such as a motor 40, and transferred to a master gear 41 in gear box 42 through a chain 43.

The male member 6 (FIG. 1) of the punch mechanism 4 is lowered by an eccentrically mounted arm 44 driven by a punch gear 45 through transfer gear 46 and chain 53.

The feed rollers 12 and 13 (FIG. 1) are controlled by feed gears 47 and 48, respectively, which mesh with each other. The feed gear 48 is rotated by a toothed rack 49 through a pinion 50 which is eccentrically mounted on an arm 51 driven by rack gear 52 controlled by transfer gear 46 through chain 53. A one way clutch mechanism (described hereinbelow) is associated with feed gear 48 so that on the downward strokes of the arm 51, the gears 47 and 48 are rotated to feed the strip of paper 1 (FIG. 1) whereas on the upward stroke of arm 51, the gears 47 and 48 are not rotated and the paper 1 will not be fed.

Rotating with the rack gear 52 is a separate stop motion gear 54 which drives a cam gear 55 through a chain 58 and which, in turn, drives a cam 56. The cam 56 acts on a toggle 59 which moves the pressure roller assembly 19 (FIG. 1) toward or away from the paper strip 1. A transfer gear 57 also rotates with cam gear 55 and drives a feed gear 60 which moves the conveyor 18.

The adhesive-applying mechanism 17 (FIG. 1) is controlled by adhesive gears 61, 62 and 63 which are rotated by gear 52 through chain 67 and drive gears 64, 65 and 66. The feeding of the transparent cover for the window is controlled by feed gears 68 and 69 through a drive gear 70 controlled by chain 67. A gear 71 is rotated with a drive gear 70 to turn the cutter gear 72. A drive gear 73 controls the rotation of the printing mechanism 35 and is also rotated by the chain 67.

Strip supply mechanism

Figure 4:
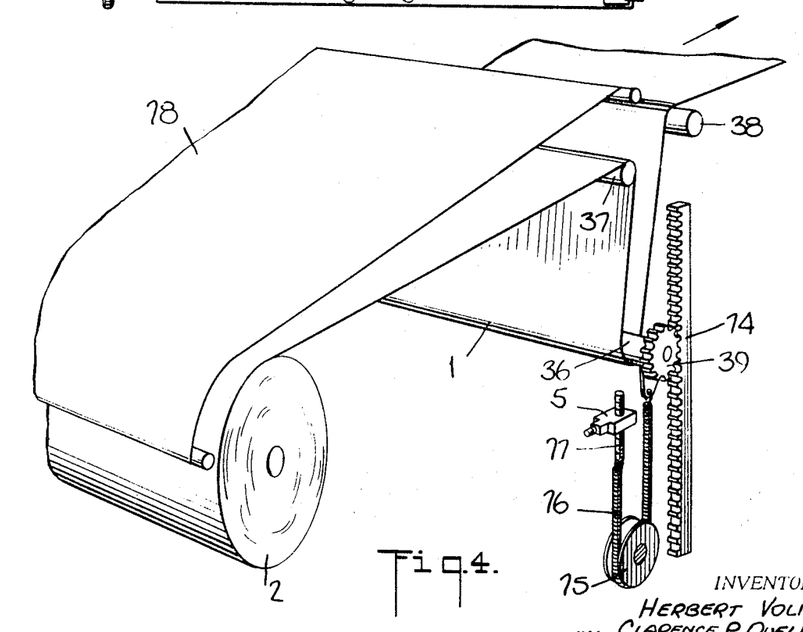
FIG. 4 is a diagrammatic perspective view of the feeder roll used to supply a continuous strip of paper to the envelope blank-forming machine.
Figure 5:
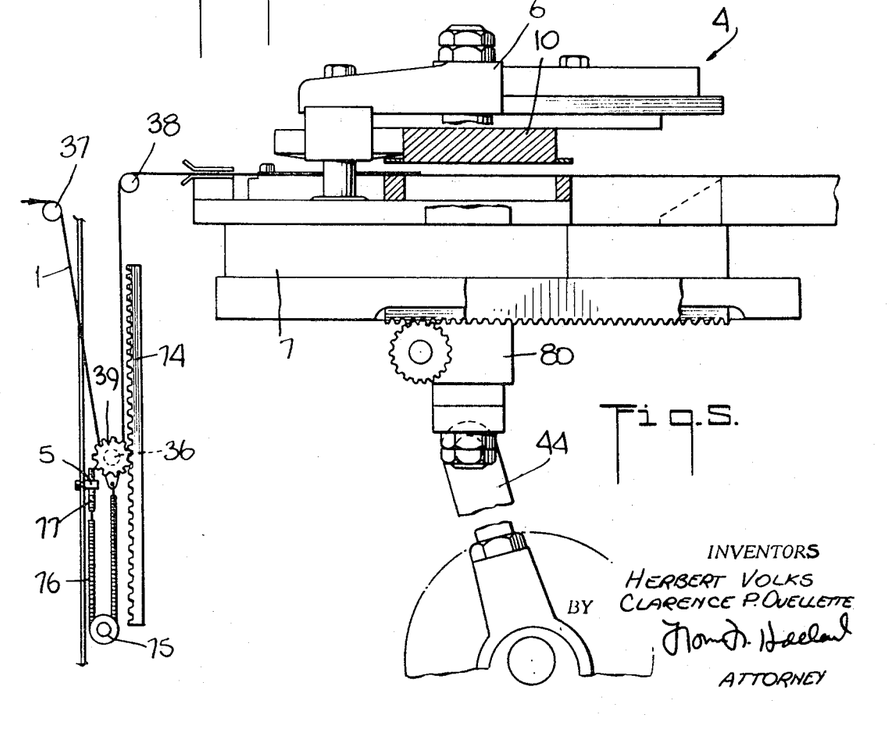
FIG. 5 is a sectional view showing the punch mechanism for forming the contours and window of the envelope blank.

The strip supply mechanism of the present invention is shown in FIGS. 4 and 5 and comprise a continuous strip 1 of sheet material, such as paper, which is fed from a supply roll 2. The paper 1 is fed to a tension roller 36 and guide rollers 37 and 38. The tension roller 36 has a pinion 39 thereon adapted to cooperate with a rack 74. Tension is applied to the strip 1 by a tension spring 76 which is mounted around a roller 75. The spring 76 has one end depending from the pinion 39 and its other end fixed to threaded member 77 adjustably mounted on the framework 5 of the machine. A shield 78 may be provided to protect the supply roll 2.

It will be seen that the spring 76 applies tension to the paper 1 which may be adjusted by the adjustable threaded member 77 or by moving the pinion 73 relative to rack 74. The paper 1 is always kept under tension for proper feeding.

Strip feeding mechanism

Figure 9:
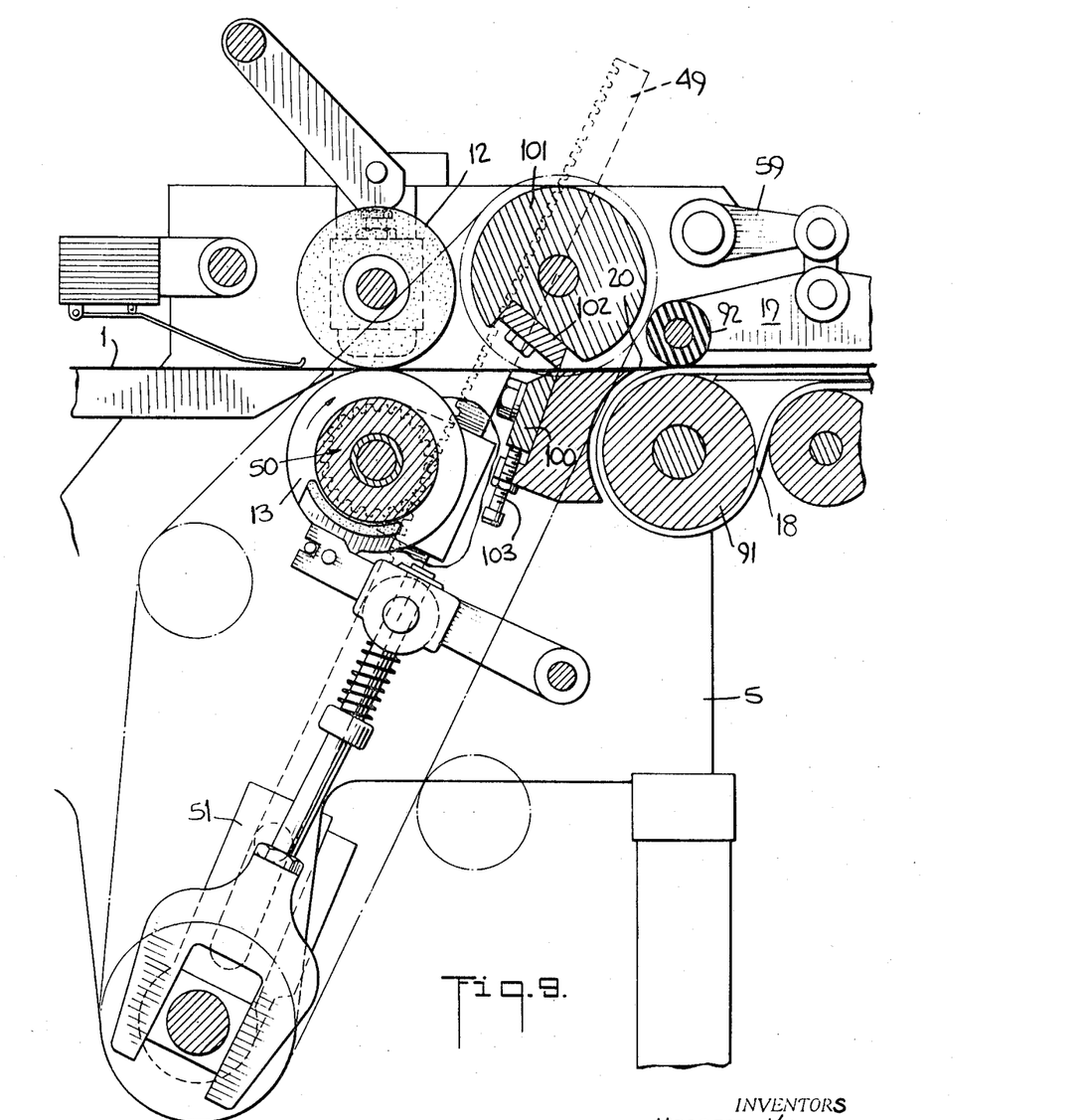
FIG. 9 is a sectional view taken along line 9—9 of FIG. 8.

The strip feeding mechanism of the present invention is shown in FIGS. 8 and 9. The strip of paper 1 is pulled by the feed rollers 12 and 13. The feed roller 12 is a pressure roller and the roller 13 is controlled by a one way clutch 90 that will permit the roller 13 to rotate in one direction (clockwise in FIG. 9) but will prevent it from rotating in the opposite direction.

The pressure roller 12 is controlled by the feed gear 47 which in turn is driven by the feed gear 48 mounted on the same shaft as the roller 13. The feed roller 13 is controlled by a pinion 50 rotated by a toothed rack 49 which in turn is controlled by the rotation of arm 51. The toothed rack 49 meshes with the pinion 50 and on the downward stroke of the arm 51 the pinion 50 will rotate to turn the roller 13 and the roller 12 through gears 48 and 47 to advance the strip 1. However on the upward stroke of the arm 51, the clutch 90 prevents the roller 13 from rotating so that the strip 1 is not advanced and remains stationary.

It is while the paper is in this stationary condition that the punch mechanism 4 punches out the slots 8 and 9 and the window 11 and it is also during this stationary condition of strip 1 that the severing mechanism 14 separates two adjacent envelope blanks 20 along the severance line 24.

Punch mechanism

Figure 6:
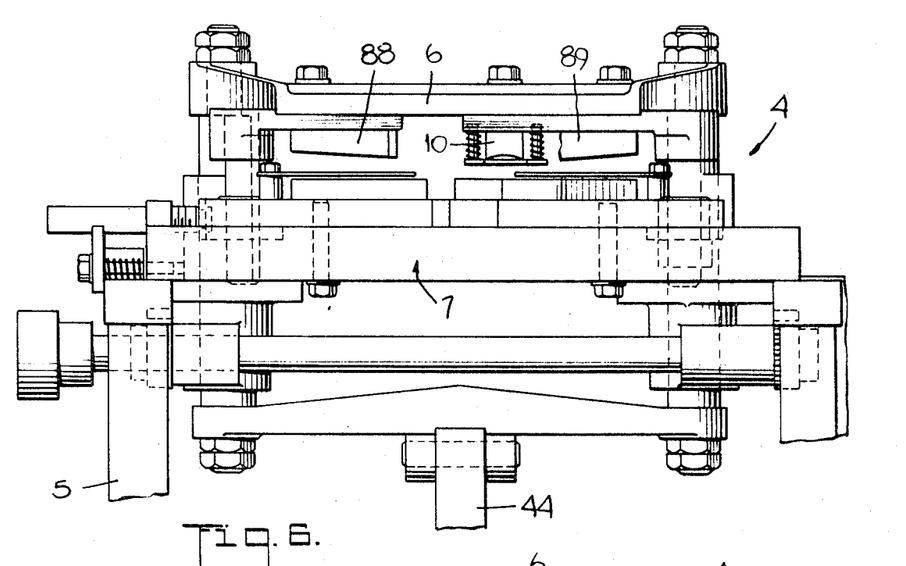
FIG. 6 is a rear view of the punch mechanism shown in FIG. 5.
Figure 7:
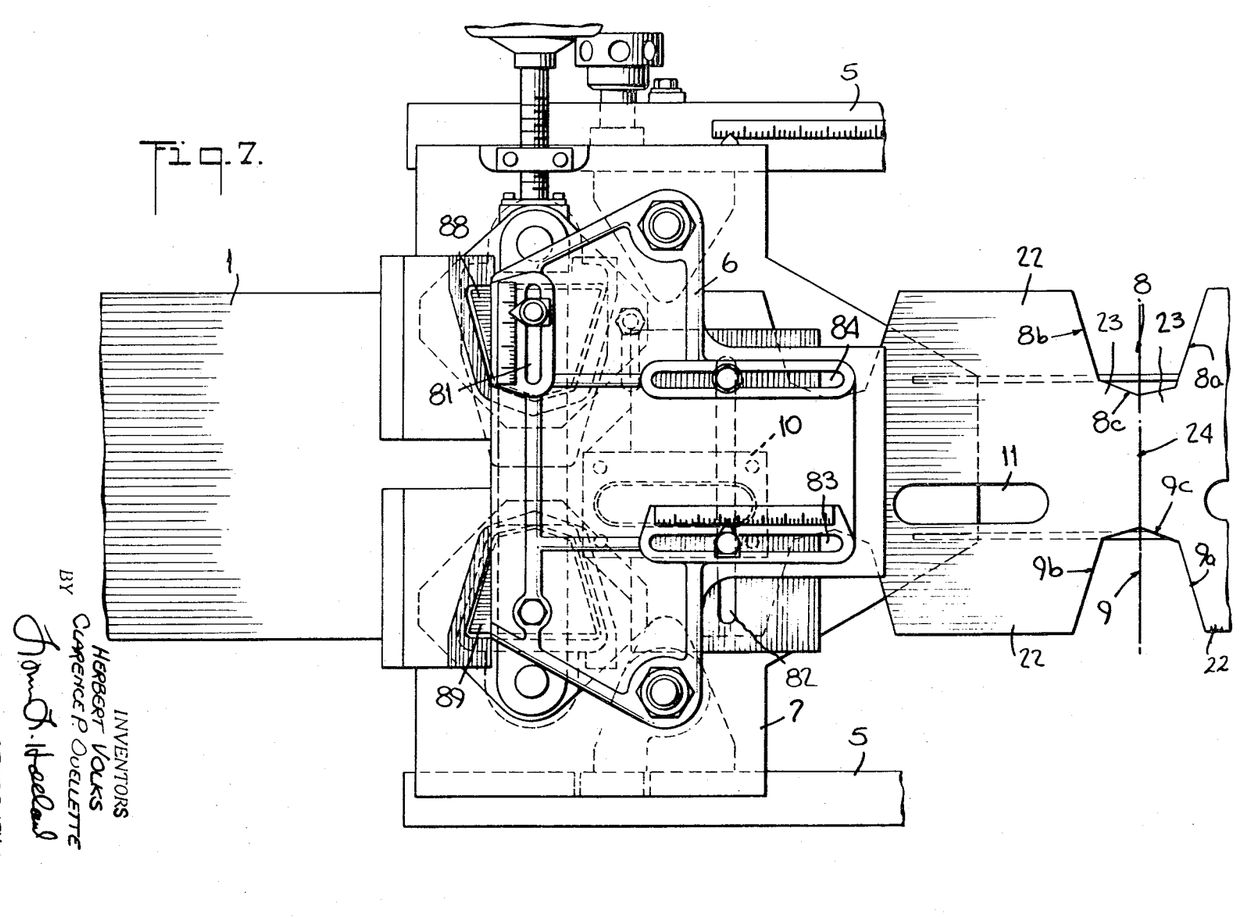
FIG. 7 is a top view of the punch mechanism shown in FIGS. 5 and 6.

The punch mechanism 4 of the present invention is shown in FIGS. 5, 6 and 7 and comprises an upper movable male member 6 and a lower stationary female member 7. The upper movable member 6 is controlled by the eccentrically driven arm 44 through link 80 mounted on upper male member 6. The arm 44 is driven by punch gear 45 (FIG. 3) and imparts upward and downward movement to the upper male member 6. The male punch member 6 has opposed male notching punches 88 and 89 depending therefrom to form the notches 8 and 9 in the strip 1. The punch element 88 is adjustable in a slot 81 (FIG. 7) so that the depth of the notches 8 and 9 may be adjusted or may be used to punch notches on paper of different sizes. In addition, by changing notching punches 88 and 89, notches 8 and 9 of different sizes and shapes may be formed.

If a window 11 is to be formed in the envelope blank 20, the movable male member 6 is provided with a window punch 10 which is mounted in intersecting slots 82 and 83 to permit it to be adjusted axially and transversely of strip 1. If no window is to be formed in the envelope blank then the window punch 10 may be removed or if two windows are to be formed a second window punch may be mounted in slot 84. Slots 82, 83 and 84 may also be used if a change is desired in the location of a single window punch 10 so that the window 11 may be formed in other parts of the envelope blank. It will be understood that a window punch of different sizes may be used to form windows of different sizes.

With this structure, the strip 1 is fed by the feed rollers 12 and 13 between the male and female punch elements 6 and 7 of the punch mechanism 4. The male punch 6 is lowered periodically to form the slots 8 and 9 in the strip and to form the window 11 therein. This operation takes place each time the strip 1 is periodically stopped.

Blank separating mechanism

The blank separating mechanism 14 for severing adjacent blanks 20 from each other is shown in FIG. 9 and comprises a rotatable roller 101 having a knife edge 102 thereon and a stationary cooperating member mounted beneath the path of movement of the strip 1. The knife 102 and the cooperating member 100 cooperate to sever adjacent blanks 20 from each other along the imaginary severance line 24 (FIG. 2). The cooperating member 100 is shown as a knife adjustable by means of set screw 103, however any cooperating member may be used, such as a block. The roller 101 is rotated by a gear 57 and is in synchronism with the feed rollers 12 and 13 so that the knife 102 strikes the strip 1 only when the strip 1 is periodically stopped and only when the severance line 24 is at the junction point between knife 102 and cooperating member 100.

Blank feeding mechanism

After adjacent blanks 20 have been cut and severed from each other, they are fed one-by-one to the adhesive-applying mechanism 17, the window covering mechanism 27 and the printing mechanism 35.

Figure 10:
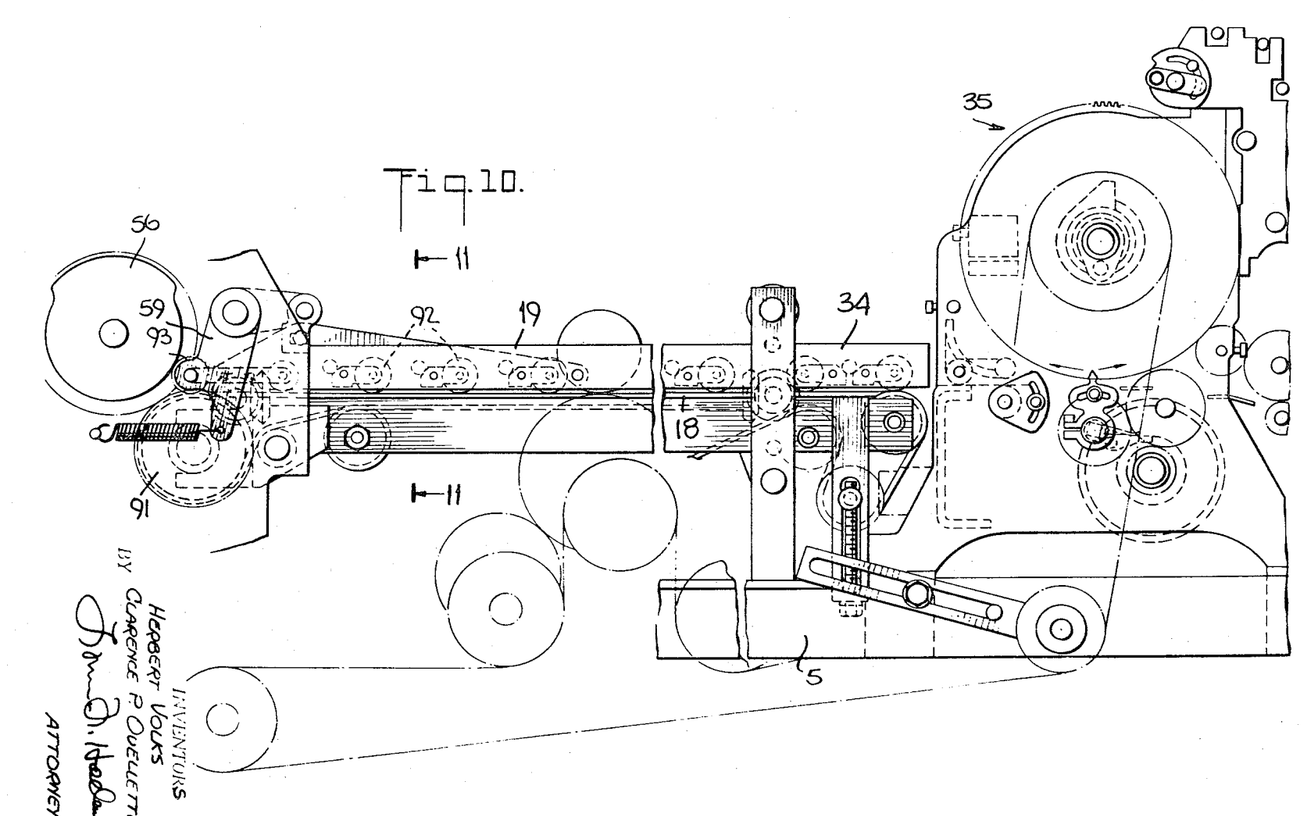
FIG. 10 is a broken away detail of the cut envelope blank feeding mechanism.
Figure 11:
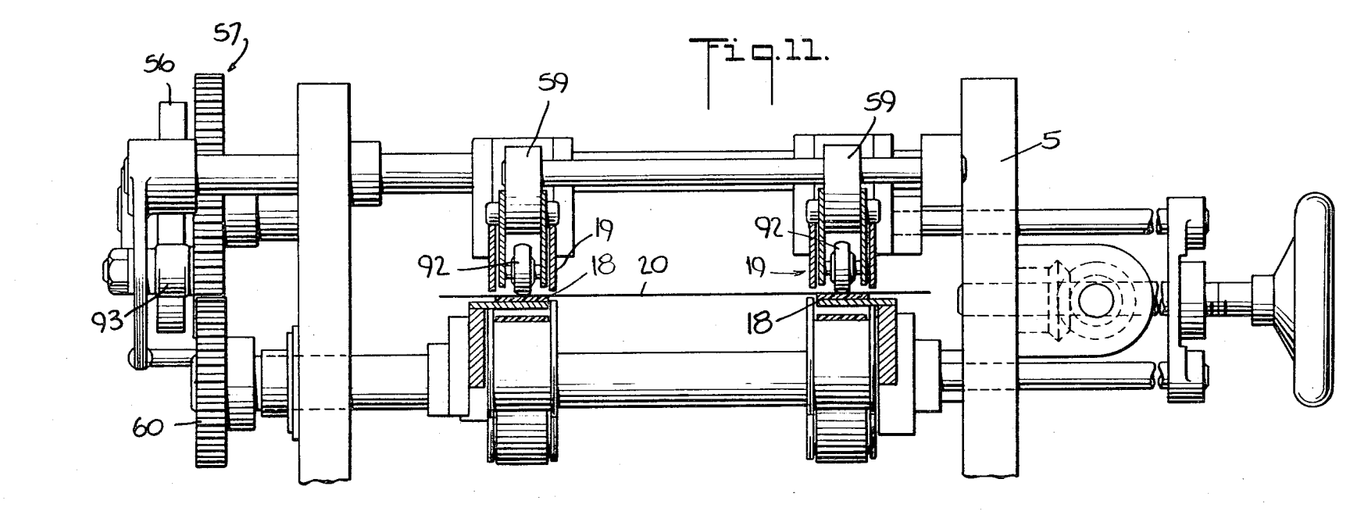
FIG. 11 is a sectional view taken along line 11—11 of FIG. 10.
Figures 12, 17:
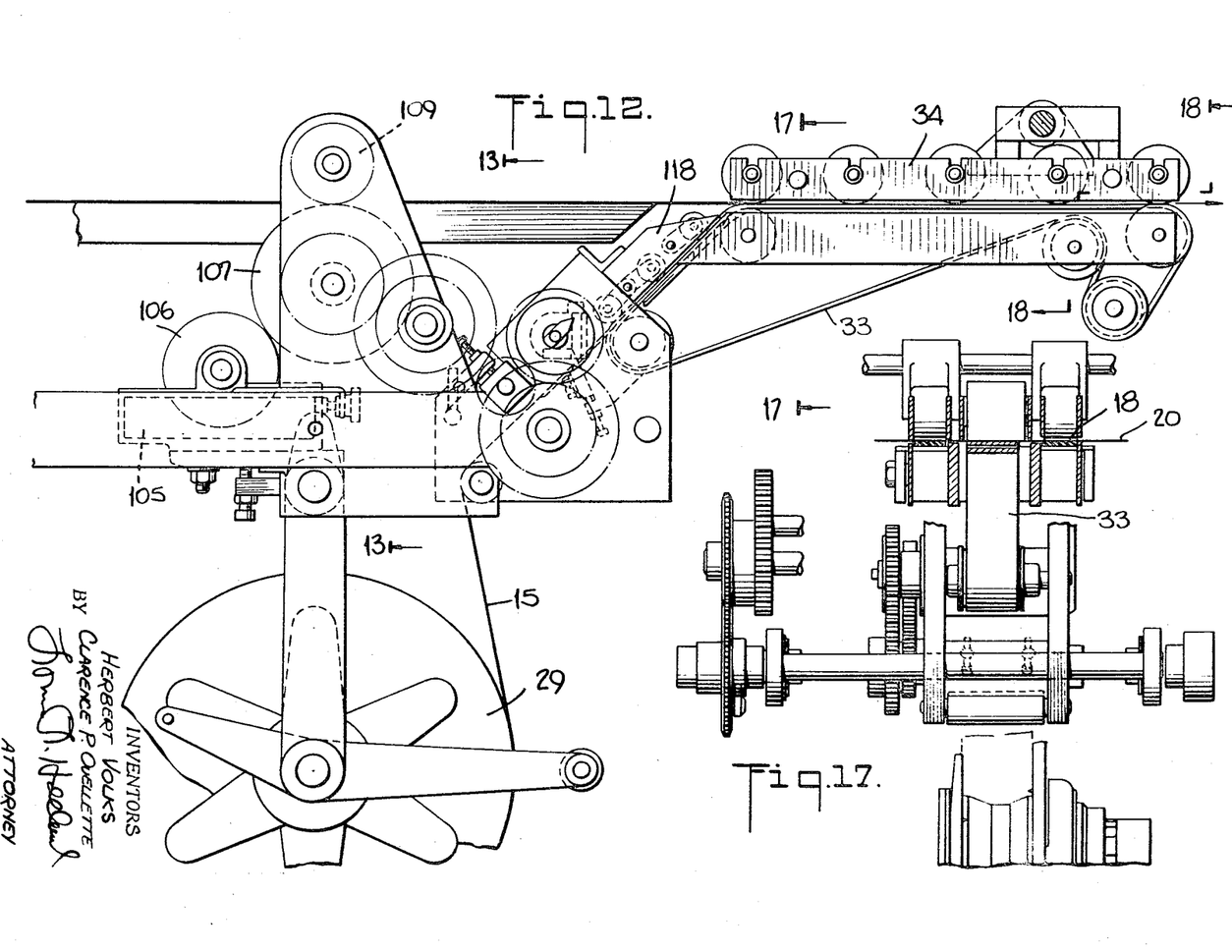
FIG. 12 is a detail view showing the means for applying the transparent cover to the window.
FIG. 17 is a sectional view taken along line 17—17 of FIG. 12.
Figure 13:
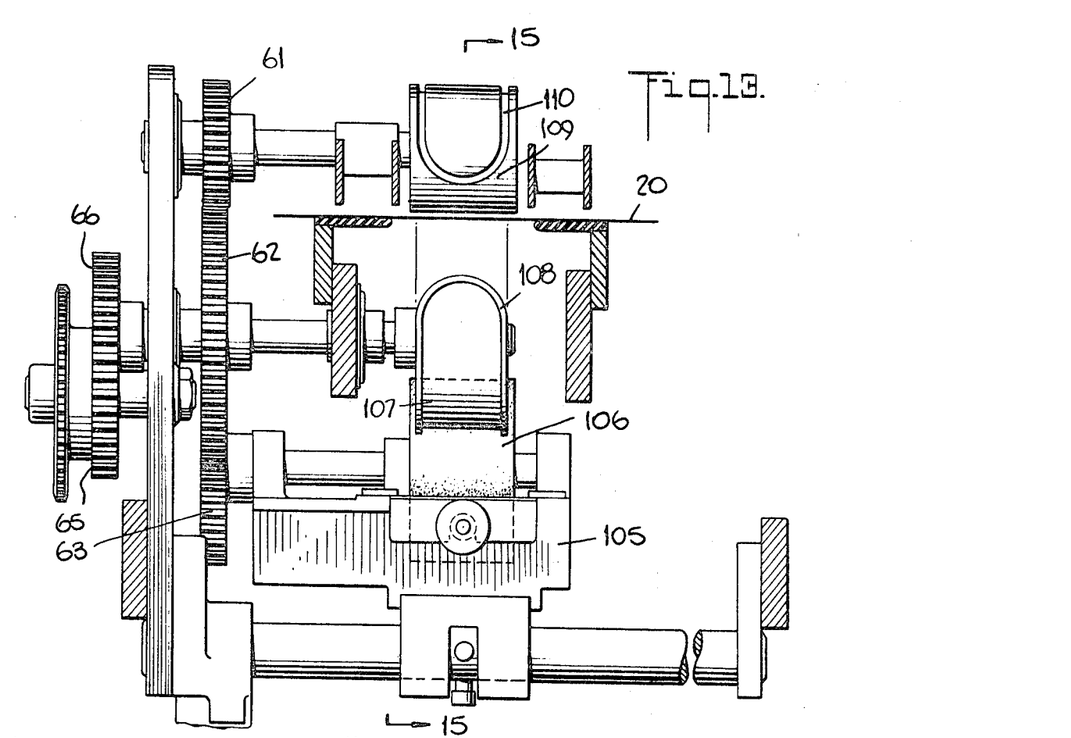
FIG. 13 is a sectional view taken along line 13—13 of FIG. 12.
Figure 14:
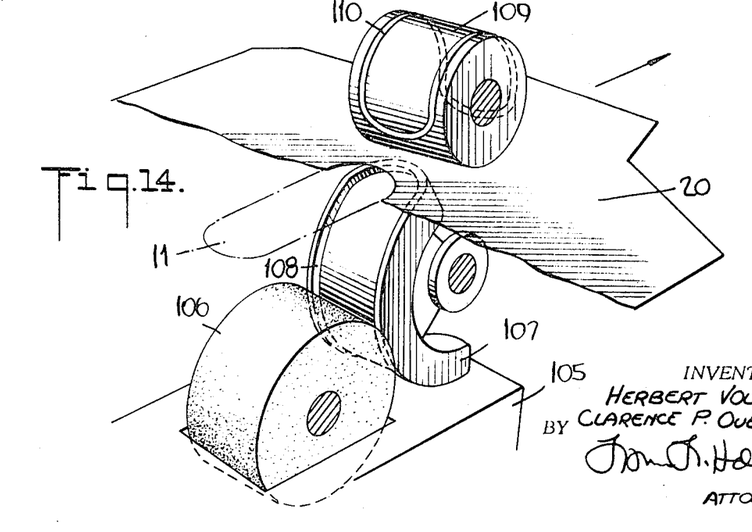
FIG. 14 is a diagrammatic perspective view showing the manner of applying adhesive around the window.
Figure 15:
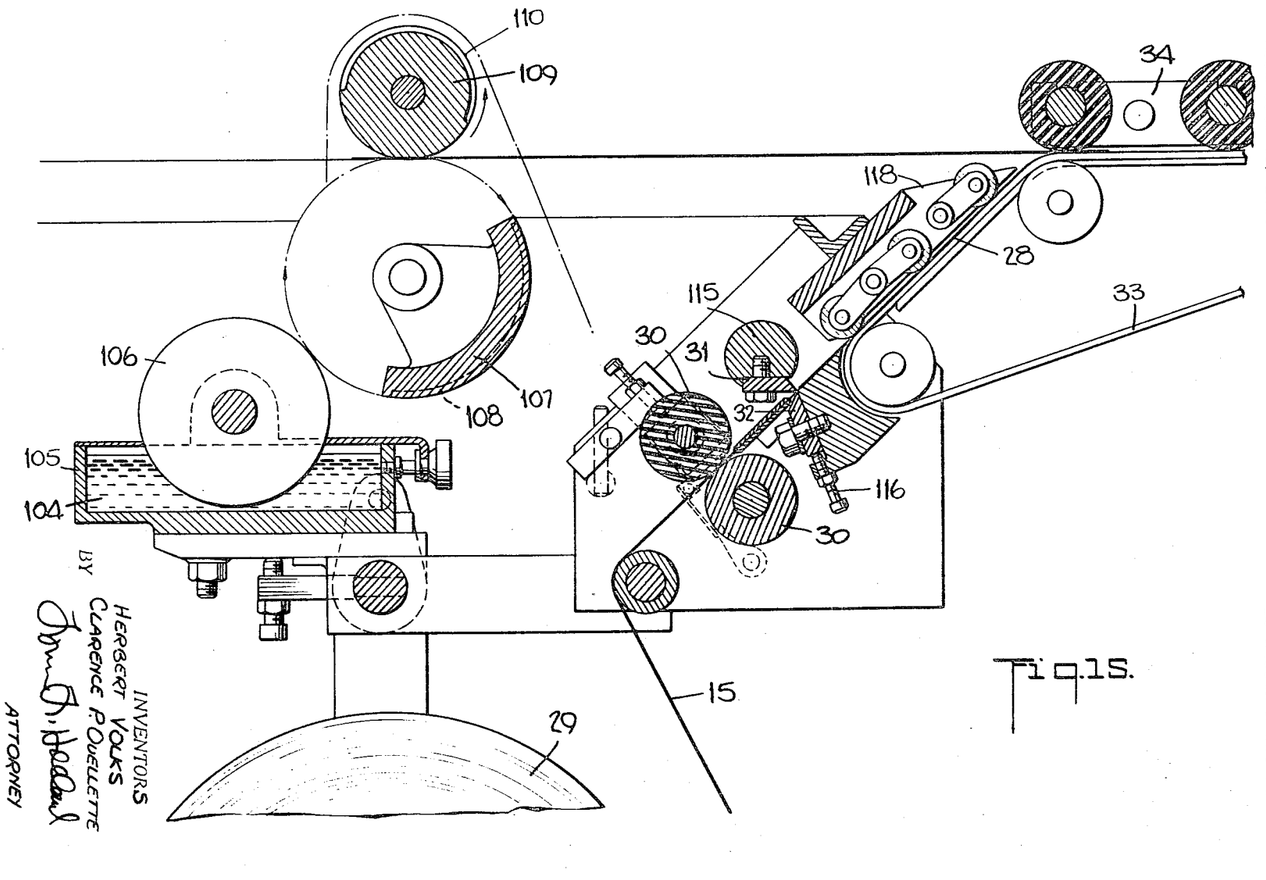
FIG. 15 is a sectional view taken along the line 15—15 of FIG. 13.
Figure 16:
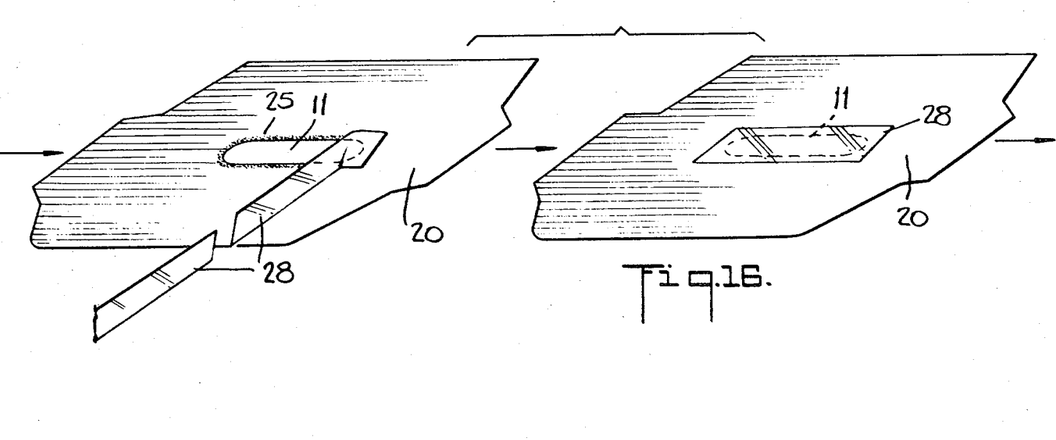
FIG. 16 is an enlarged diagrammatic perspective view showing the manner of applying a transparent cover to the window.

The blank feeding mechanism comprises the pressure roller assembly 19 shown in FIGS. 10 and 11, and comprises a conveyor 18 controlled by a roller 91 which is rotated by the feed gear 60. The pressure roller assembly 19 comprises a plurality of pressure rollers 92 and is mounted on a two arm rocking toggle 59. The toggle 59 has a cam follower 93 controlled by a cam 56. As the cam 56 rotates, it will strike the follower 92 to rock the toggle 59 and raise the roller assembly 19 so that each blank 20 may be inserted between the roller assembly 19 and the conveyor 18. When the cam 56 is off the follower 93 of the toggle 59, the assembly 19 is lowered so that no blanks 20 can be fed therebetween.

The operation of the cam 56 is synchronized with the operation of the severing mechanism 14 so that as each blank 20 is severed by knife 102 (FIG. 9), the assembly 19 is raised to permit an envelope blank 20 to be inserted therebetween and fed to the other mechanisms in the machine.

Adhesive applying mechanism

The adhesive applying mechanism is shown in FIGS. 12, 13, 14 and 15. It comprises a glue pot 105 containing an adhesive 104 and an adhesive supply roller 106 mounted in said glue pot 105 and rotated by gear 63. Offset from the supply roller 106 is a curved applicator shoe 107 which is rotated by gear 66 and has a raised circumferential adhesive-applying surface 108 having straight sides and curved ends. Located immediately above the adhesive-applying shoe 107 is a pressure roller 109 rotated by gear 61 which has a circumferential depression 110 which has straight side walls and curved ends adapted to match and to receive the raised adhesive-applying surface 108 of adhesive-applying shoe 107.

The adhesive 104 is transferred from the glue pot 105 to the raised surface 108 of shoe 107 through the intermediation of the feed roller 106. The glue is applied to the underside of the blank 20 passing thereby around the window 11 and simultaneously as the area of the blank around window 11 is pressed from the top by the groove 110 of the roller 109. This squeezes the blank 20 between the roller 107 and shoe 109 so that the adhesive 25 is applied around the edge of the window 11.

If the blank 20 does not have a window, this can be eliminated.

Window cover applying mechanism

The blank 20 is then fed to a window cover applying mechanism 27 which is shown in FIGS. 12, 15, 16, 17 and 18.

The window cover applying mechanism comprises a continuous strip 15 of transparent material, such as glassine, fed from a supply roller 29. The strip 15 is fed by feed rollers 30, rotated by gears 68 and 69 between stationary cooperating member 32 and a rotating roller 115 having a cutting blade 31 thereon. The stationary cooperating member 32, is shown in the drawings as a knife edge adjustable by set screw 116, however any cooperating member may be used, such as a block. The rotating roller 115 is synchronized to periodically cut off predetermined lengths of window covers 28. The cut segments 28 of the strip 15 forming the window covers are moved by a conveyor 33 beneath pressure roller assembly 118 and pressure roller assembly 34 and into contact with the blank 20 which is being moved thereover by pressure roller assembly 34 and conveyor 18. Each glassine cover 28 is adhered to the window 11 of blank 20 by contact with the adhesive 25 around the window 11 in order to cover the window.

If the envelope blank does not have a window 11 or a window covering is not desired, this mechanism may be eliminated.

Decorating mechanism

Each blank 20 is then moved to the decorating mechanism 35 shown in FIGS. 1 and 10. The decorating mechanism 35 may be any suitable type of printing mechanism having a printing surface 26. The printing mechanism 35 may apply postage information or advertising on the blank 20 or it may apply the return address. The decorating mechanism 35 may be eliminated if no printing is to be applied to the blanks 20.

The finished blank is deposited into a suitable hopper 36 which in the drawings has been shown as having upstanding corner positioning elements 85 and 86.

Operation

The operation of the present invention will now be summarized for convenience.

The strip of paper 1 is taken from the supply roll 2 and after being placed under tension by the tensioning device 70, is fed to the punch mechanism 4. The forward movement of the strip 1 is stopped and the male member 6 of the punch mechanism 4 is lowered to cut the notches 8 and 9 in the sides of the strip 1 and, if a window is desired, punch mechanism 10 cuts a window 11 therein.

The attached blanks 20 are then moved beneath a rotating knife 102 which severs two adjacent blanks 20 along severance line 24 while the strip 1 is stationary and while the previous blank is being punched by the punch mechanism 4.

The separated blank 20 is then moved to the adhesive applying mechanism 17 which will apply an adhesive coating 25 around the window 11. A window cover 28 of glassine which has been fed and cut from a supply roller 29 is placed into contact with the adhesive coating 25 around window 11 so as to cover the window. The finished blank 20 is thereafter moved to the printing mechanism 35.

It will be seen that if an envelope blank without a window is desired then the window punch 10, the adhesive applying mechanism 17 and the glassine applying mechanism 27 may be eliminated and if no printing is desired, the printing mechanism 35 may be eliminated.

It will thus be seen that the present invention provides an improved mechanism for forming envelope blanks from a continuous length of sheet material which operates at greater speeds, which is versatile and produces envelopes of different sizes and types to be found and in which each blank will be uniform without expensive maintenance being required.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. An envelope blank forming machine comprising a supply roll having a continuous strip of material thereon, means for feeding said continuous strip of material to a punch mechanism, a tensioning mechanism interposed between the said supply roll and said punch mechanism to maintain said strip under tension, said punch mechanism comprising a lower female member and an upper male member, means for moving said strip of material between said members, the upper male member of the punch mechanism having a plurality of spaced adjustable notch forming elements adapted to punch notches along the edges of the strip to form adjacent connecting envelope blanks, said male punch member being provided with an adjustable window punching element adapted to simultaneously form a window in each envelope blank, means for moving said blanks to a severing mechanism comprising a knife mounted on a rotatable roller mounted on one side of the blank and a stationary cooperating member on the opposite side adapted to cooperate with each other to sever adjacent blanks along a severance line between said blanks, said strip feeding mechanism comprising feed rollers controlled by a rack and gear, said rack controlled by a rotatable arm and being adapted to rotate the roller in one direction when the rack is moved in one direction to advance said strip, a clutch operatively connected to said feed roller in order to prevent the feed roller from rotating in the opposite direction when the rack is moved in the opposite direction so that the strip is stopped, the punching operation and the severing operation occurring while the paper is in said stopped position, means for applying an adhesive around said window comprising a shoe having a raised portion and adapted to apply adhesive around the window on one side of the blank and a pressure roller on the other side of the blank having a depressed portion adapted to receive said raised portion of said shoe and apply pressure to the other side of said blank, means for feeding severed blanks to said adhesive applying mechanism, said feeding means comprising a roller assembly mounted on a toggle, said toggle having a cam follower, a rotating cam to control said cam follower, said cam being adapted to actuate said toggle periodically to raise said roller assembly, means for moving said envelope blanks to a transparent cover applying mechanism which comprises a continuous strip of transparent material, a supply roll adapted to feed said continuous strip, means for severing said transparent strip into separate transparent covers of predetermined lengths, said severing means comprising a knife mounted on a rotating roller and a stationary cooperating member adapted to cooperate with each other, a conveyor adapted to move each severed transparent cover into contact with the adhesive around said window to permit the transparent window to be applied thereon, and indicia-applying means adapted to apply a predetermined indicia onto each envelope blank.

References Cited
UNITED STATES PATENTS

| | | | |
|---|---|---|---|
| 1,201,777 | 10/1916 | Vierengel | 93—63 |
| 1,289,084 | 12/1918 | Banzett | 93—63 |
| 1,969,610 | 8/1934 | Jager | 93—63 |
| 2,257,829 | 10/1941 | Winkler. | |
| 2,284,872 | 6/1942 | Jaeger. | |
| 2,694,351 | 11/1954 | Winkler | 93—63 |
| 2,703,043 | 3/1955 | Novick. | |
| 2,734,431 | 2/1956 | Bartelt. | |
| 3,254,575 | 6/1966 | Skow. | |
| Re. 26,371 | 4/1968 | Schultz | 93—58 |
| 2,951,304 | 9/1960 | Herte. | |

FOREIGN PATENTS 788,013  12/1957  Great Britain.

WAYNE A. MORSE, Jr., Primary Examiner

U.S. Cl. X.R.

93—33, 34, 36, 58, 61, 73